UNITED STATES PATENT OFFICE.

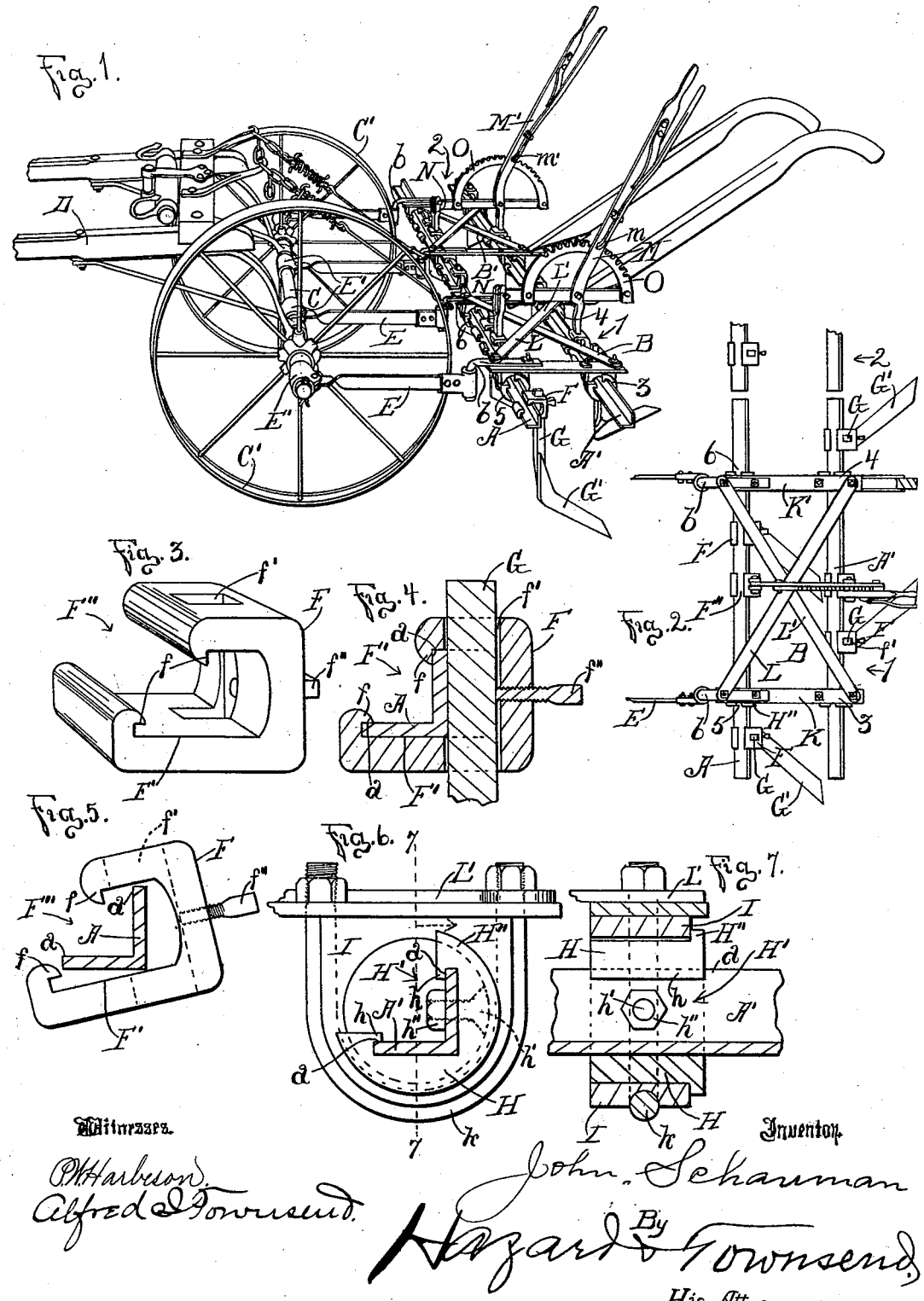

JOHN SCHAUMAN, OF ANAHEIM, CALIFORNIA.

CULTIVATOR.

SPECIFICATION forming part of Letters Patent No. 521,272, dated June 12, 1894.

Application filed January 23, 1894. Serial No. 497,762. (No model.)

*To all whom it may concern:*

Be it known that I, JOHN SCHAUMAN, a citizen of the United States, residing at Anaheim, in the county of Orange and State of California, have invented new and useful Improvements in Cultivators, of which the following is a specification.

My invention relates more particularly to those cultivators which are designed to be used in cultivating crops which are grown in rows, such for instance as sugar-beets, corn, &c.

The object of my invention is to provide an improved cultivator of this class which shall be more convenient to use, and in which the teeth may be conveniently and rapidly removed from or placed upon the supporting shafts, and adjusted with relation to each other, to cut nearer to or farther from the rows of plants which are to be cultivated.

A further object of my invention is to so arrange and proportion the parts of the cultivator as to produce a cultivator of maximum strength and minimum lightness.

My invention comprises certain features of construction and combinations of parts hereinafter set forth and claimed.

The accompanying drawings illustrate my invention.

Figure 1 is a perspective fragmental side elevation of a cultivator embodying my invention. Fig. 2 is a fragmental plan view illustrating the arrangement of one of the journal frames in which the angular tooth supporting shafts are journaled. Fig. 3 is a perspective view of my improved clip whereby the adjustment of the teeth longitudinal of the tooth supporting shafts is rendered rapid and convenient. Fig. 4 is a sectional view of the same showing the clip in position upon the tooth supporting shaft. Fig. 5 is a view illustrating the manner of removing the clip from, or placing it upon the angle iron shaft. Fig. 6 is a fragmental detail illustrating the journal whereby I journal the angle iron tooth supporting shafts to the journal frame. Fig. 7 is a sectional view of the same on line 7—7, Fig. 6.

My invention comprises the combination of the two supporting shafts A and A' which are each made of angle iron in order to secure rigidity and strength combined with lightness. These supporting shafts are journaled in a suitable journal frame B (B') which is attached to a suitable supporting and draft axle C which is mounted upon wheels C' and provided with shafts D or any other suitable means for attaching animals thereto. This frame is attached to the supporting and draft axle by means of the draft bars E which are pivoted at their front ends to journal sleeves E' which are journaled upon the axle C, and are pivoted at their rear ends to the frame B by means of the pivot arms $b$ which are attached to such frame and project forward therefrom. This manner of attaching the frame B to the shaft C allows the frame with its teeth attached thereto to be moved laterally with relation to the draft axle to cause the teeth to pass an obstruction or to miss a plant where the rows of plants are irregular, without moving the draft axle, and such construction also allows the frame to be lifted up to remove the teeth from the soil when desired.

In order to provide convenient means for quickly adjusting the cultivator teeth along the shaft to change the position of the teeth with relation to each other, I provide a shaft embracing clip F consisting of a body provided with an angle-iron receiving opening F', open upon one side F'' and provided with the inwardly projecting lugs $f$ arranged to embrace the edges $a$ of the angle-iron shaft as shown in Fig. 4. These clips are each provided with a tooth shank receiving slot $f'$ which is arranged to receive the shank G of the cultivator tooth G'. A set screw $f''$ is arranged to screw through the rear portion of the clip to engage with the shank G of the cultivator to force such shank forward against the angle-iron and thereby force such angle-iron forward against the lugs $f$ to bind the clip firmly upon the shaft. By having the clips open upon one side as shown, when it is desired to remove the clip from the shaft A, the set screw $f''$ is loosened to allow the shank of the cultivator tooth to be removed from the slot $f'$ in the clip. The clip is then moved forward to release the lugs $f$ from their engagement with the edges $a$ of the angle-iron and by canting the clip as shown in Fig. 5, it may be removed from or replaced upon the shaft with great facility.

In order to provide cheap and simple means for journaling the angle-iron shafts A (A') to the journal frames B (B') I provide suitable journal bearings which each comprises a semi-cylindrical journal sleeve H which is adapted to fit upon such shaft and is open upon one side H' and is provided at one end with the projecting flange H'' and is also provided with the projecting lugs $h$ adapted to embrace the edges $a$ of the angle-iron. These sleeves are slipped upon the angle-iron shafts from the ends thereof and are secured in place upon the sleeve by a bolt $h'$ which is countersunk into the sleeve and the nut $h''$ screws upon such bolt upon the inside of the sleeve, the open side H' of the sleeve allowing ready access to place the nut upon the bolt. A rivet may be employed in the place of the bolt if desired. A thimble I is arranged to fit upon the outside of the cylindrical journal sleeve as shown in Fig. 7.

As shown in the drawings, the cultivator is provided with two independent sections 1, 2, which are respectively provided with the journal frames B B' which are adapted to journal the angle iron-shafts to allow them to partially rotate to force the cultivator teeth into and to withdraw them from the soil. These journal frames each comprise the combination of four journals which are numbered in the drawings 3, 4, 5, and 6, respectively, and are arranged, two journals, 3 and 4 upon the rear shaft and two journals, 5 and 6 upon the front shaft. The sleeves H of the journals are reversely arranged upon the shafts, so the flanges of each pair of journals, 3, 4 and 5, 6 respectively, will be arranged upon the inner end of each sleeve, (or upon the outer end thereof,) and the thimbles I are arranged one upon each of such sleeves; connecting bars K K' are arranged respectively to connect each pair of front and rear thimbles with each other. These bars are secured to the sleeves by means of strap bolts $k$ which are arranged encircling the thimbles I as shown in Figs. 6 and 7 and pass through the connecting bars K K' and are secured by means of nuts screwed upon the ends of the bolt.

L L' are frame stiffening braces which are arranged to extend diagonally across from each of the front thimbles to one of the rear thimbles as shown in Fig. 2; these braces are secured to the frame by the strap bolts $k$. These braces hold the thimbles, I, rigidly in position with relation to each other and the flanges H'' of the sleeves H being reversely arranged engage with the thimbles to prevent such thimbles from becoming displaced therefrom. I thus provide a cheap and light frame which allows the shafts A and A' to be revolved to force the cultivator teeth G into the soil or to withdraw them therefrom.

M and M' are actuating levers which are similar in construction and are fixed respectively to the independent sections B and B'. Each lever is attached at its lower end to the rear shaft A' of its respective section, as shown in Fig. 1, by means of one of the clips F, and an operating arm N (N') is also fixed to the front shaft A by one of the clips F; an arc rack O is pivoted to the operating lever M (M') and is also pivoted at its front end to the operating arm N (N') and a pawl $m$ ($m'$) is arranged upon the lever M (M') to engage the arc rack. In practice the clip F is placed in position upon the angle iron shafts A (A') before the cultivator shank G is inserted in the slot in the clip, this is accomplished by canting the clip as shown in Fig. 5, and then sliding the clip upon the shaft into the position shown in Fig. 4. Then the cultivator shank G is inserted up through the slot $f'$ and the set screw $f''$ is screwed inward to force the cultivator shank firmly against the angle iron A (A') to bind the clip and the shank firmly in position upon such shaft.

By using the angle iron shaft great strength and lightness are secured, and by the use of my improved clip the adjustment of the clips upon the shaft can be made rapidly and with great facility, and additional teeth may be placed in position upon the shaft without removing any of the teeth already in position thereupon.

Now, having described my invention, what I claim as new, and desire to secure by Letters Patent, is—

1. The combination of the angle-iron shaft; the semi-cylindrical journal sleeve arranged to fit upon such shaft and provided at one end with a projecting flange, and also provided with the inwardly projecting lugs adapted to embrace the edges of such angle-iron; the bolt or rivet securing such sleeve to the shaft, and the thimble arranged to fit upon the journal sleeve, substantially as and for the purpose set forth.

2. In a cultivator the combination of the angle-iron supporting shaft, the clip open on one side and provided with the projecting lugs arranged to engage such angle-iron and provided with a vertical shank slot arranged at the rear side of such clip and adapted to receive the shank of a cultivator tooth therein; the cultivator tooth shank arranged in such shank slot, and suitable means arranged to bind such shank against the angle-iron.

3. In a cultivator, the combination of the front and the rear tooth supporting shafts; the journal sleeves, each provided at one end with a flange, two sleeves being reversely arranged upon each of such shafts; the thimbles one arranged upon each of such sleeves; the connecting bars connecting each pair of front and rear thimbles, and the braces one extending diagonally from each of the front thimbles to one of the rear thimbles and arranged to hold such thimbles rigidly in position relative to each other.

4. In a cultivator the combination of the angle iron supporting shaft; the clip arranged upon such shaft and provided with a vertical shank slot adapted to receive the shank of a cultivator tooth therein; the cultivator tooth shank arranged in such shank slot and the set screw arranged to force the shank against the angle iron.

JOHN SCHAUMAN.

Witnesses:
JAMES R. TOWNSEND,
ALFRED I. TOWNSEND.